Patented Oct. 22, 1929

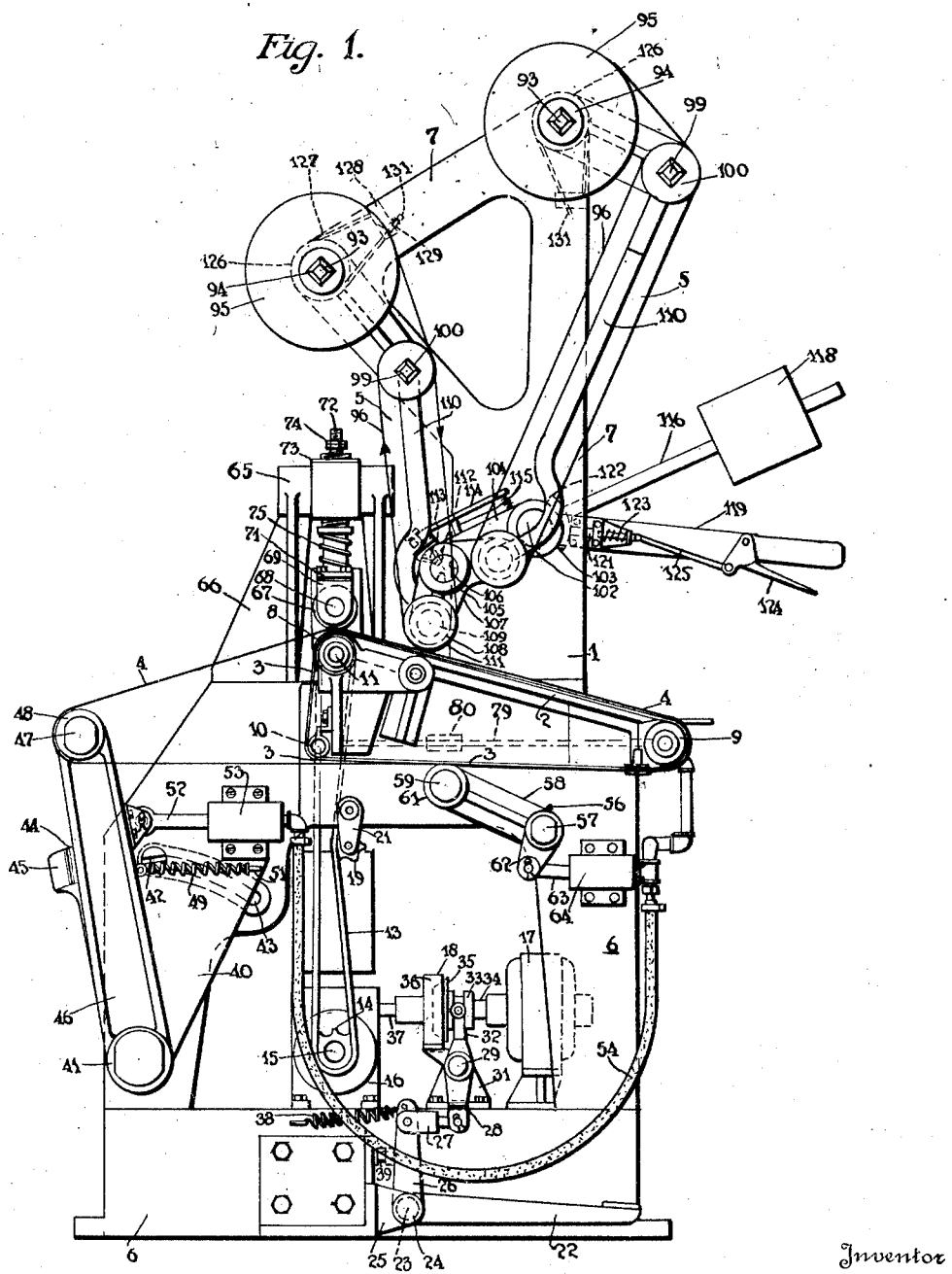

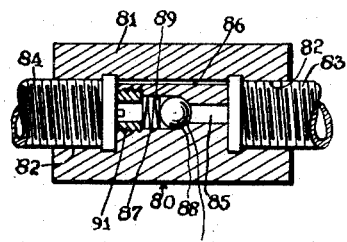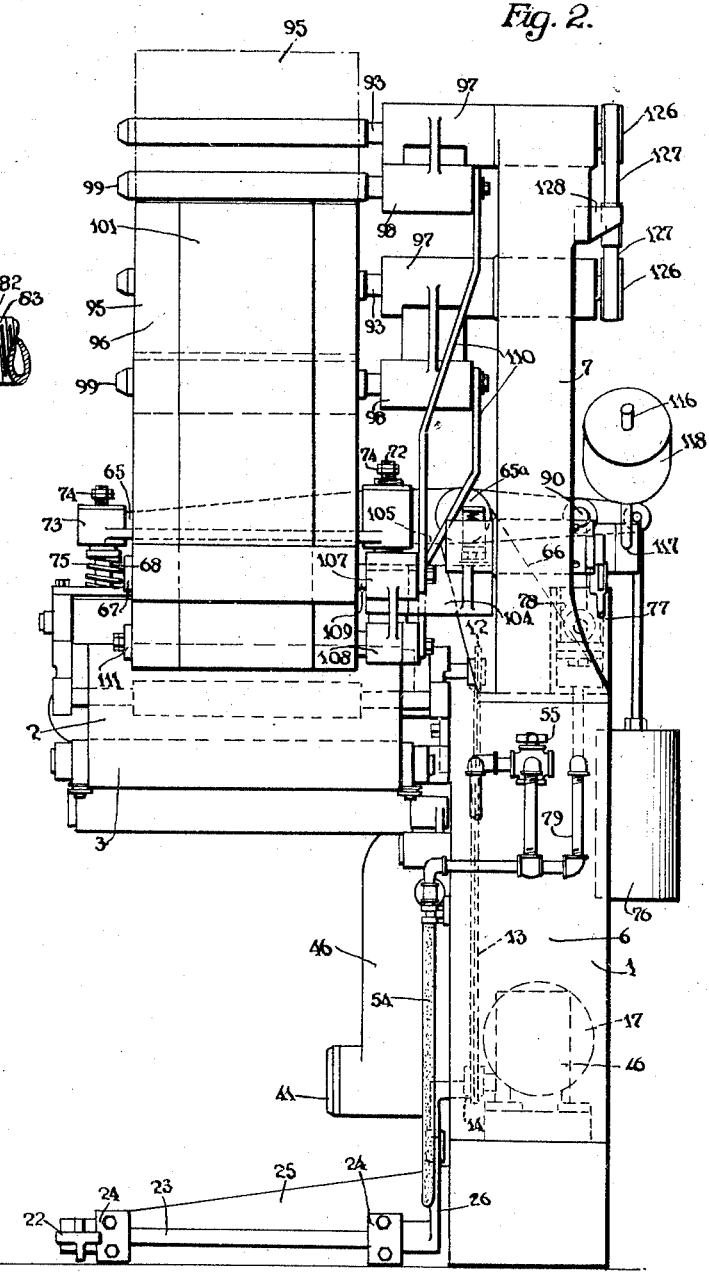

1,732,759

UNITED STATES PATENT OFFICE

ELOV F. MAAS AND EDWIN G. TEMPLETON, OF AKRON, OHIO, ASSIGNORS TO THE GOODYEAR TIRE & RUBBER COMPANY, OF AKRON, OHIO, A CORPORATION OF OHIO

BAND-MAKING MACHINE

Application filed September 30, 1927. Serial No. 223,013.

Our invention relates to fabric band making machines and it has particular relation to machines of the above designated character which shall be especially applicable for the assembling of the component parts of bands for subsequent incorporation in pneumatic tires.

In accordance with the present practice, tire casings are built up by assembling several endless bands in superimposed relation on, and formed about, collapsible cores. The bands employed for different types of tires, and also for different parts of the same tire, differ in their construction. For convenience in manufacture, the bands of different types and sizes are usually assembled on special machines and are delivered to the tire builder as needed.

Some of these bands comprise a single strip of frictioned cord or woven fabric having its ends joined to form an endless band and having a strip of gum compound, commonly known as a squeegee strip, secured centrally thereto. Other bands comprise two layers of plies of frictioned fabric joined together in endless form with a squeegee strip disposed between them, while still others are built up of three or more strips of frictioned fabric having squeegee strips of like or different widths disposed between adjacent fabric strips.

Although machines have been provided, by means of which a single length of tire fabric may be formed into an endless band, and provided with a strip of gum material applied centrally thereto from a roll of such material supported by the machine, it has been necessary heretofore to perform separate operations upon each band for each width of squeegee applied thereto.

One object of our invention is to provide a band making or assembling machine capable of applying squeegee strips of different width alternately to endless fabric bands mounted thereon.

A further object of the invention is to provide a device of this character wherein a plurality of similar mechanisms or units for supporting and feeding squeegee material are employed, together with means for selectively positioning the mechanisms in operative position with respect to a fabric strip carried by the machine.

A still further object of the invention is to provide a novel means for selectively feeding strips of material into juxtaposition to a moving web.

Another object of our invention is to provide a simple and efficient mechanism whereby a band embodying a plurality of fabric strips and a plurality of squeegee strips of like or different width may be assembled in a single continuous operation.

With these and other objects in view, our invention consists of the novel features of construction, the combinations of elements, and the arrangements of parts hereinafter described and claimed.

In the accompanying drawings;

Fig. 1 is a front elevational view of a band assembling machine embodying the features of our invention;

Fig. 2 is a side elevational view thereof;

Fig. 3 is a fragmentary detail view, on a larger scale, of a check valve shown in Fig. 1.

Figure 4:
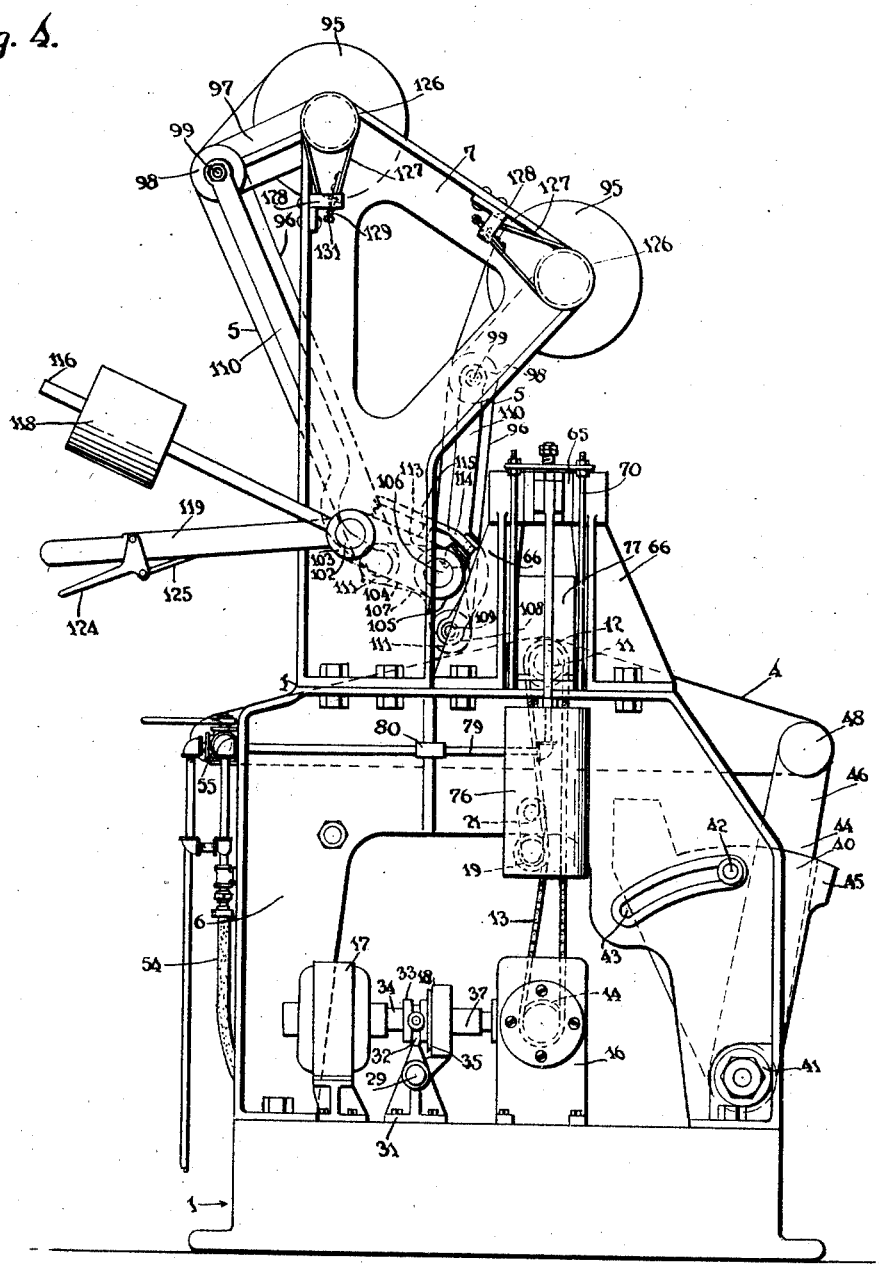
Fig. 4 is a rear elevational view of the apparatus shown in Figs. 1 and 2.

The apparatus involved in the particular embodiment of our invention illustrated by the accompanying drawings includes a machine frame 1 supporting an inclined table 2, a conveyor in the form of an endless belt 3, a portion of which passes over the table 2, and means for training an endless strip 4 of fabric about the conveyor to travel therewith. A pair of squeegee supporting and feeding units 5 are carried by the frame and means is provided whereby the units may be selectively moved into and out of operative relation with respect to the table 2.

As shown, the frame 1 comprises a lower substantially rectangular portion 6 and an upper section 7 of substantially triangular shape. Rollers 8 and 9 are journalled adjacent the opposite ends of the table 2 and a third roller 10 is suitably mounted, directly below the roller 8, adjacent the upper end of the table. The endless belt 3 is trained about the rollers 8, 9 and 10 and serves to convey the strips 4 of fabric placed thereon.

The roller 8 is secured to a shaft 11 having adjacent its end a sprocket wheel 12 driven through the agency of an endless chain 13, which passes over a sprocket wheel 14 carried by a shaft 15 extending from a speed reduction device 16, which is driven by an electric motor 17. A clutch 18 is provided to disengage the motor from the speed reduction device. An idler sprocket wheel 19 is supported upon a bracket 21 pivotally connected to the frame member 6 and serves to tighten the chain 13 by its engagement therewith.

The clutch 18 is operated by a treadle 22 secured to the end of a shaft 23 journalled in bearings 24 carried by an auxiliary frame member 25 attached at one of its ends adjacent the bottom of the machine frame member 6.

An arm 26 keyed to the inner end of the shaft 23 extends upwardly therefrom and is pivotally connected to one end of a short rod 27. The rod 27 has a pivotal connection at its opposite end to the free end of an arm 28 keyed to, and depending from, a horizontal shaft 29 having suitable bearing in a bracket 31 secured to the frame member 6. An arm 32 keyed at one end to the shaft 29 has its other end pivotally and slidably mounted within a groove of a collar 33 which is slidable on but rotates with a rotor shaft 34 of the motor 17. The collar 33 carries one element 35 of the clutch 18 and the other element 36 thereof is secured to a shaft 37 of the speed reduction device 16.

Downward pressure upon the free end of the treadle 22 rotates the shaft 23 in a clockwise direction (as viewed in Fig. 1 of the drawing) and this movement through the agency of the arm 26, the rod 27, and the arm 28 causes rotation in the opposite direction of the shaft 29. Rotation of the shaft 29 in a counter-clockwise direction moves the upper end of the arm 32, as well as the collar 33 and the clutch element 35 to the left, which causes engagement of the clutch elements 35 and 36 and consequent rotation of the shaft 37 to drive the machine.

A spring 38 secured to the frame member 6 and to the top of the arm 26 normally retains the latter in vertical position against an adjustable limit stop 39, secured to the frame 6. It will be observed that when the arm 26 is in its vertical or normal position the clutch elements 35 and 36 are disengaged.

As the strips 4 of fabric are usually formed by the operator at the machine, means is provided whereby the correct length of fabric to be formed into an endless band of predetermined size may be readily determined. As shown, this means comprises a plate 40 of substantially sector-shape pivoted to the frame-member 6 of the machine, as indicated at 41, and provided with a bolt 42 extending rearwardly therefrom for engagement in an arcuate slot 43 formed in the frame to secure the plate adjustably to the frame. A scale 44 is provided on the upper surface of the plate, and is utilized in conjunction with a stationary pointer (not shown) provided on the machine frame accurately to position the plate. The plate 40 is formed with a projection or stop 45 for engagement by a fabric tensioning device.

An arm 46 also pivotally connected to the frame at 41, supports a shaft 47 which has mounted thereon a roller 48 disposed substantially in alignment with the roller 9. A spring 49 secured at one end to an intermediate point on the arm 46 and at its other end, as indicated at 51, to a stationary point on the frame, serves normally to retain the arm in a position adjacent the table 2.

As shown, a piston-rod 52, pivotally connected at one end to the arm 46 and having its other end movable in a cylinder 53 secured to the frame, serves to move the arm 46 against the stop 45 when fluid under pressure is admitted into the cylinder. The cylinder 53 has suitable connection, as by a flexible hose 54, to a valve 55 controlling the pressure fluid.

A bell crank lever 56 pivotally secured to the frame intermediate its ends, as indicated at 57, carries at the end of its longer arm 58 a shaft 59, on which is mounted a freely rotatable roller 61, and is connected at the end of the shorter arm 62 to a piston-rod 63 disposed within a cylinder 64 secured to the frame. This cylinder likewise has suitable connection to the valve 55. The function of the mechanism just described is to support the lower portion of an endless band of fabric during the squeegee applying operation.

Means is provided for compressing the fabric strips as they pass about the table 2, and comprises an arm 65 pivotally mounted, as indicated at 65ª, intermediate its length upon vertically disposed brackets 66 secured to the frame member 6. Yieldingly and adjustably depending from the arm 65 is a roller 67 carried by a shaft 68 journalled in end members 69 of a cross plate 71. As shown, this plate is provided with threaded pins 72, which extend through collars 73 formed in the arm and are secured in position by nuts 74 on the ends thereof, spring 75 being mounted between the plate and the arm. A weight 76 is suspended from the opposite end of the arm 65 and serves normally to maintain the roller 67 in elevated position.

A cylinder 77, secured to the frame member 6 of the machine, has disposed therein a piston 78 the upper end of which is pivotally connected, as indicated at 90, to the arm 65 between the pivotal point thereof and the point at which the weight is suspended. The lower end of the cylinder 77 is connected by a pipe line 79 to the operating valve 55. An auxiliary frame 70 serves to limit upward movement of the weighted end of the arm 65.

As the arm 65 and the roller 67 carried thereby are comparatively heavy, it is desirable that the return of these elements to inoperative position, by means of the weight 76, be so cushioned as to obviate damage to the machine. This result is obtained by the insertion in the pipe line 79 of a valve 80, especially designed to permit practically unobstructed flow of fluid therethrough in one direction, while limiting materially the flow of fluid in the opposite direction.

This valve, as best shown in Fig. 3, embodies a coupling element 81 drilled and threaded at opposite ends, as indicated at 82, for connection to pipes 83 and 84. The threaded ports 82 in the coupling are connected by a relatively large passage 85 communicating with a smaller unobstructed passage 86. The passage 85 includes an enlarged portion 87 in which a ball 88 is yieldably and adjustably supported by a coil spring 89 and a hollow plug 91 threaded into the coupling element. The ball 88 is normally urged against a shoulder 92 to close the passage 85, but it is readily forced from that position, against the opposition of the spring 89, by fluid pressure in the pipe 83. The valve 80, therefore, serves to admit full pressure to the cylinder 77 when the valve 55 is opened, but when the valve 55 is turned to an exhaust position, the ball 88 closes the passage 85, and the pressure in the cylinder is gradually relieved through the small passage 86.

Each unit 5 of the squeegee supporting and feeding apparatus preferably includes a rectangular shaft 93 having one end mounted in a suitable bearing in the frame member 7 and supporting a hollow rectangular wooden core 94, upon which a roll 95 of squeegee material separated by the usual liner strip 96 is mounted. An arm 97 is rotatably mounted on the shaft 93, and carries at its free end a bearing 98, in which is rotatably mounted a shaft 99, also squared to fit within a wooden core 100, upon which the liner strip 96 is wound after the removal therefrom of the squeegee strip 101.

A shaft 102, passsing through and having suitable bearing in the frame member 7, as indicated at 103, carries on its inner end a radially extending arm 104 provided at its free end with a bearing 105. A short shaft 106 is rotatably mounted in bearing 105 and is secured at its outer end to the center of a bearing supporting arm 107 formed with spaced bearings 108 which rotatably support shafts 109 on which are mounted rubber-covered applying rollers 111. The free end of each arm 97 is pivotally connected to the corresponding end of the bearing supporting arm 107 by a bar 110 of irregular shape.

Means is provided whereby the shaft 106 may be locked in adjusted positions with respect to the bearing 105, in which it is mounted. This means comprises a plurality of spaced indentations 112 in the shaft that are engaged by a pointed pin 113 carried at the end of a lever 114 fulcrumed, as indicated at 115, on the arm 104 in a convenient position for manipulation. A rod 116 secured at one end to one end 117 of the shaft 102 adjustably supports a weight 118 which tends to rotate the shaft in one direction. The shaft 102 may be rotated by an arm 119 rigidly secured thereto, and may be locked in adjusted positions by the engagement of a pin 121 against abutments 122 (one only being shown) formed on the machine frame. A spring 123 normally maintains the pin 121 in locking position and a hand 124 pivotally connected to the arm 119 and to the pin 121 by a rod 125 is provided to withdraw the pin 121.

In order that the feeding of the combined liner and squeegee strip from the supply roll 95 thereof may be controlled, a grooved wheel 126 is mounted on the end of each shaft 93 for engagement with a strap 127 secured at one end to a bracket 128 and adjustably connected at its other end to the same bracket by means of a bolt 129 and nut 131.

In the operation of the apparatus hereinbefore described, supply rolls 95 of squeegee material of different widths are positioned on the squared portions of the shafts 93, and the strips therefrom are fed over the corresponding shafts 99 and under the corresponding applying rolls 111. One or two turns of each liner 96 are then wound upon a wooden core 100 and the machine is ready for operation.

After the plate 40 has been so set that the stop 45 thereon will limit outward movement of the arm 46 in order that a strip of fabric passing tightly about the table and about the roller 48 will produce an endless band of the desired length, such a length of fabric is placed upon the machine and the arm 119 is manipulated to permit a lowering of the bearing supporting arm 107, thus actuating the applying rollers 111 into juxtaposition to the table 2. The lever 114 is then depressed and the bearing supporting arm 107 is rotated to bring the squeegee strip 101, passing about one of the applying rollers 111, into contact with the fabric on the table 2. By depressing the treadle 22 the operator then causes the shaft 11 to be driven, which drives the endless belt 3 and all of the rollers of one of the supporting and applying units 5.

As the fabric travels the squeegee strip 101 is separated from the liner strip 96 and adheres to the endless fabric strip 4. As soon as one complete revolution of the latter has been made, the operator stops the machine. Then by manipulation of the arm 119 the bearing supporting arm 107, together with the applying and wind-up rollers of each of the supporting and applying units 5, is raised away from the table 2. A second strip of fabric is then applied upon the first strip with the squeegee strip interposed.

It is, of course, understood that the operation of the valve 55 causes downward movement of the arm 65 and the roller 67 carried thereby, as well as an outward movement of the roller 48 carried by the pivoted arm 46 and an upward movement of the roller 61 carried by the longer arm of the bell crank lever 56. When the fluid pressure is relieved, the arm 65 is returned to its normal position through the agency of the weight 76, the arm 46 is returned to normal position by the action of the spring 49, and the supporting roller 61 returns to its normal position by reason of its own weight.

It will be observed that the operation of the motor 17 will cause movement of the endless belt 3 and, if the valve 55 is open, the endless fabric strip 4 trained about the table and the roller 48 will also be driven, regardless of the position of the squeegee supporting and applying units 5. As soon as the second layer of fabric has been added to the band, the operator lowers the applying and wind-up rolls of the other unit 5 into operative position, and applies a strip of the wider squeegee material in the same manner to the band. A third strip of fabric is then applied to the band and the completed band is removed from the machine. This is permitted by closing of the fluid pressure valve 55 which causes the return of the roller 67 to its normal position.

From the foregoing description it will be apparent that a band making machine has been provided which is capable of fully performing the function ascribed to it and which will materially augment the production of tire bands including as components a plurality of squeegee strips of different widths.

Although we have illustrated only one form which our invention may assume, and have described in detail but a single application thereof, it will be apparent to those skilled in the art that it is not so limited but that various minor modifications may be made therein without departing from the spirit of the invention or from the scope of the appended claims.

What we claim is:

1. A machine for assembling strips of material comprising means for conveying a strip and means for selectively causing a plurality of other strips to be applied to the conveyed strip.

2. A band making machine comprising a frame, means for feeding a strip of fabric to the machine and means for selectively applying strips of squeegee of different width to the fabric strip.

3. A band making machine comprising a frame, a table carried thereby, means for feeding a fabric strip across the table and means for selectively applying strips of different width to the fabric strip.

4. A band making machine comprising a frame, a table carried thereby, an endless belt trained about the table, means for driving the belt, means for tensioning an endless strip of fabric about the table to travel with the belt, and means for selectively applying squeegee of different widths to the strip of material on the belt.

5. A band making machine comprising a frame, a table carried thereby, a plurality of squeegee supporting and applying units movably supported on the frame, and means for selectively moving the units into operative relation to the table.

6. A band making machine comprising a frame, a table secured thereto, means for feeding a web across the table, a pair of squeegee supporting and feeding units carried by the frame and means for simultaneously withdrawing portions of one unit from operative position and moving portions of the other unit into operative position with respect to the table.

7. A band making machine comprising a frame, a table secured thereto, means for feeding a web across the table, a pair of squeegee supporting and feeding units carried by the frame, means for simultaneously withdrawing portions of one unit from operative position and moving portions of the other unit into operative position with respect to the table and means for simultaneously moving portions of both units to and from operative position with respect to the table.

8. A band making machine comprising a frame, a table secured thereto, means for feeding a web across the table, a pair of squeegee supporting and feeding units carried by the frame, means for simultaneously moving portions of both units to and from operative position with respect to the table and means for selectively moving the units into operative position with respect to the table.

9. A band making machine comprising a frame, a table secured thereto, means for feeding a web across the table, a pair of squeegee supporting and feeding units carried by the frame; each unit comprising a roll supporting shaft journalled in the frame, an arm rotatably mounted on the shaft, a wind-up roll-supporting shaft journalled in the free end of the arm, a supporting member having pivotal connection to the frame, a roller supporting shaft projecting from the member, a roller mounted on the roller-supporting shaft, and means connecting the free end of the arm to a member; means for simultaneously moving portions of both units to and from operative position with respect to the table and means for selectively moving the units into operative position with respect to the table.

10. A band making machine comprising a frame, a table carried by the frame, rollers mounted adjacent opposite ends of the table, an endless belt trained about the rollers and table, means for driving one of the rollers, means for mounting an endless strip of fabric to travel with the belt, means for rotatably mounting a plurality of supply rolls of squeegee material above the table and means for selectively moving strips of material from the respective rolls into juxtaposition to the fabric strip.

11. In a band making machine, a frame, a table supported thereby, rollers mounted adjacent the ends of the table, a plate formed with a stop and an arm pivotally connected at a common point to the frame, means for locking the plate to the frame in adjustable positions, a shaft projecting from the arm, a roller on the shaft, and means for forcing the arm toward the stop.

12. In a band making machine, a frame, a table supported thereby, rollers mounted adjacent to the ends of the table, a plate formed with a stop, an arm pivotally connected adjacent the plate to the frame, means for locking the plate to the frame in adjustable positions, a shaft projecting from the arm, a roller on the shaft, and pneumatic means for forcing the arm toward the stop to tension an endless strip of fabric trained about the rollers.

13. In a band making machine, a frame, a table supported thereby, rollers mounted adjacent the ends of the table, an endless belt trained about the rollers, means for driving one of the rollers, an arm pivotally mounted intermediate its ends to the frame, a roller rotatably mounted on the frame and adapted when the arm is in operative position to coact with one of the rollers adjacent to the table, means normally retaining the arm in inoperative position, and means for moving the arm to retain it in operative position.

14. In a band making machine, a frame, supply roll supporting shafts journalled in and extending from the frame, arms rotatably mounted on the shafts, wind-up roll supporting shafts journalled in the free ends of the arms, a supporting member, a shaft projecting from an intermediate portion of the bearing supporting arms and journalled in the frame, roller-supporting shafts secured to and projecting from opposite ends of the supporting member, rollers mounted on the last mentioned shafts, and rigid links pivotally connecting the free ends of the arms to the respective ends of the supporting member.

15. In a band making machine, a frame, roll-supporting shafts journalled in the frame, arms rotatably mounted on the roll-supporting shafts, wind-up roll-supporting shafts journalled in the free ends of the arms, a supporting arm, means pivotally connecting the supporting arm intermediate its ends to the frame, roller supporting shafts projecting from the free ends of the supporting shafts projecting from the free ends of the supporting arm, rollers mounted on the roller supporting shafts, and means pivotally connecting the free ends of the arms to the respective ends of the supporting arm.

16. In a band making machine, a frame, roll-supporting shafts journalled in the frame, arms rotatably supported on the roll-supporting shafts, wind-up roll-supporting shafts journalled in the free ends of the arms, a supporting arm, a shaft journalled in the frame, a crank arm extending radially from an end of the shaft, means pivotally connecting the supporting arm intermediate its ends to the free end of the crank arm, roller supporting shafts projecting from the free ends of the supporting arm, rollers mounted on the roller supporting shafts and means for pivotally connecting the free ends of the arms to the respective ends of the supporting arm.

17. In a band making machine, a frame, roll-supporting shafts journalled in the frame, arms rotatably supported on the roll-supporting shafts, wind-up roll-supporting shafts journalled in the free ends of the arms, a supporting arm, a shaft journalled in the frame, a crank arm extending radially from an end of the shaft, means pivotally connecting the supporting arm intermediate its ends to the free end of the crank arm, roller-supporting shafts projecting from the free ends of the supporting arm, rollers mounted on the roller-supporting shafts, means pivotally connecting the free ends of the arms to the respective ends of the supporting arm, means for moving the shaft to and locking it in adjusted positions with respect to the frame, and a weighted arm extending radially from the shaft.

18. A band making machine comprising a table, means for moving a fabric strip across the surface of the table, a stitching roller operatively associated with the table for engaging the strip, means for moving the roller and the strip relatively, and means for varying the rate of operation of the latter in one direction.

19. A band making machine comprising a table, means for moving a fabric strip across the surface of the table, a stitching roller operatively associated with the table for engaging the strip, a pneumatic cylinder device for moving the roller relative to the table, means for supplying fluid under pressure to the pneumatic device, and a check valve having a by-pass associated therewith for varying the quantity, in one direction, of fluid supplied by the last mentioned means.

20. A band making machine comprising a table, a pair of rollers disposed adjacent the opposite ends of the table for supporting an endless conveyor, means disposed externally to the conveyor for tensioning an endless band supported by the latter, and a stitching roller operatively associated with the conveyor.

21. A band making machine comprising a table having an endless conveyor disposed thereon, a movable roller disposed externally to the conveyor for supporting a portion of an endless band also partially supported by the conveyor, and pneumatic means associated with the roller for controlling the position of the latter relative to the conveyor.

22. A band making machine comprising a table for supporting a fabric strip, a pair of reel supporting shafts rotatably disposed adjacent the table, a bodily movable stitching roller rotatably mounted adjacent the table, and a link connecting the latter to one of the reel supporting shafts.

23. A band making machine comprising a table for supporting a fabric strip, a reel supporting shaft rotatably mounted in spaced relation to the table, a rotatable arm concentrically disposed relative to the shaft, a second reel supporting shaft rotatably mounted adjacent the end of the arm, a stitching roller, for engagement with the table, rotatably mounted adjacent the end of a second rotatable arm and a rigid link connecting the stitching roller and the last mentioned reel supporting shaft.

24. A band making machine comprising a table for movably supporting a fabric band, a rocker arm pivotally mounted adjacent the table, a pair of stitching rollers rotatably mounted at opposite ends of the rocker arm, means for oscillating the arm to provide alternate engagement between the stitching rollers and the table, and means for feeding separate strips of material to each of the stitching rollers.

25. A band making machine comprising a table for movably supporting a fabric band, a rocker arm pivotally mounted adjacent the table, a pair of stitching rollers rotatably mounted at opposite ends of the rocker arm, means for oscillating the arm to provide alternate engagement between the stitching rollers and the table, means for feeding separate strips of material to each of the stitching rollers, and means for moving the rocker arm bodily relative to the table.

Signed at Akron, in the county of Summit and State of Ohio, this 29 day of Sept., 1927.

ELOV F. MAAS.
EDWIN G. TEMPLETON.